United States Patent

Winnett

[15] 3,648,591
[45] Mar. 14, 1972

[54] VENTILATOR WITH SHUTTER MEANS

[72] Inventor: Ronald Winnett, c/o Barclays Bank, Tenterden, Kent, England

[22] Filed: Oct. 20, 1969

[21] Appl. No.: 867,606

[52] U.S. Cl. ..................98/39, 98/40 C, 98/41 AV, 98/94
[51] Int. Cl. ............................................F24f 7/06
[58] Field of Search ..............98/40 C, 94, 2.07, 39, 43, 98/33, 40 D, 41; 138/39

[56] References Cited

UNITED STATES PATENTS

| 3,105,520 | 10/1963 | Lorett et al. | 138/39 |
| 2,987,980 | 6/1961 | Winn | 98/2.7 |
| 3,052,176 | 9/1962 | Anderson | 98/33 |
| 3,186,329 | 6/1965 | Kennedy | 98/40 A |
| 3,320,869 | 5/1967 | Schach | 98/40 D |
| 3,331,302 | 7/1967 | Baumann et al. | 98/33 |
| 3,429,251 | 2/1969 | Simon | 98/94 |
| 3,475,869 | 11/1969 | Jahn | 98/40 D |

Primary Examiner—Meyer Perlin
Assistant Examiner—Ronald C. Capossela
Attorney—Wenderoth, Lind & Ponack

[57] ABSTRACT

A ventilator for panel mounting, for example in a glass window pane or an automobile car body panel, consists of a hollow main body having a stem carrying an electrically driven fan and fixed through a hole in the panel, and two branches off the stem to each of which branches is connected as a prolongation thereof an elongate flexible duct having a plurality of vent openings. The duct preferably has a shutter behind the vent openings and internal air guides in the form of resilient sheet material housed in grooves formed in two opposite sidewalls of the duct for directing a proportion of the airflow to each opening. The ducts may be rotatable about their longitudinal axes and can be sprung off for cleaning. The main body may house a replaceable air filter element.

9 Claims, 12 Drawing Figures

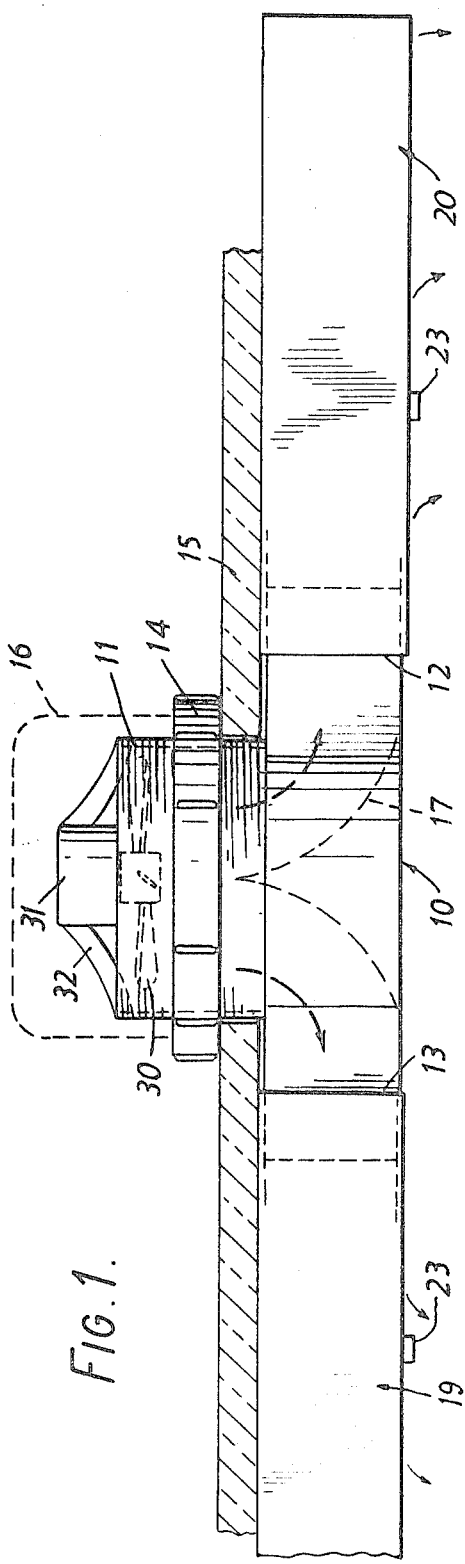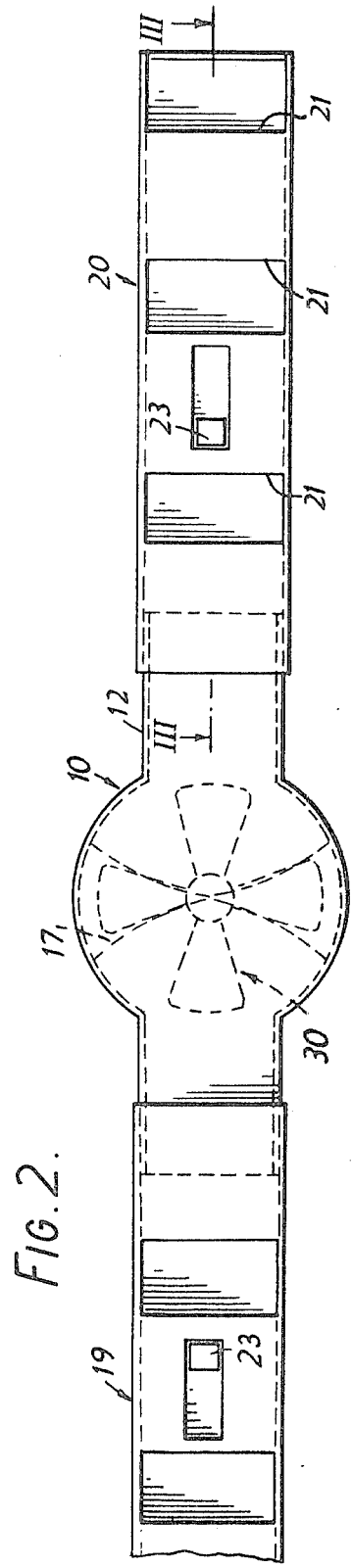

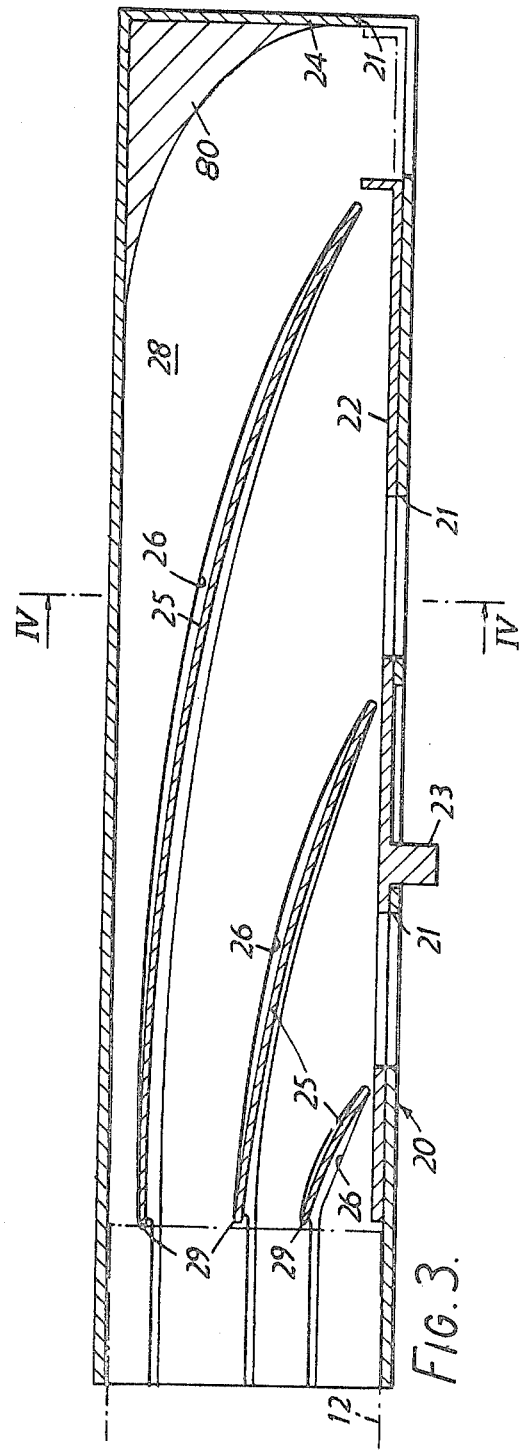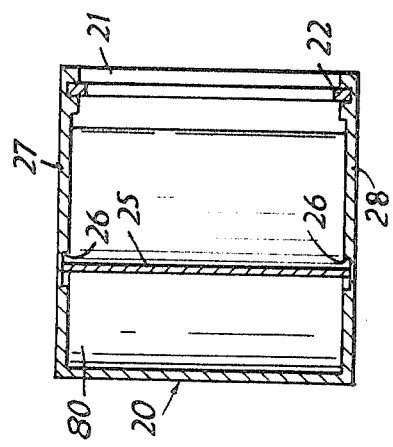

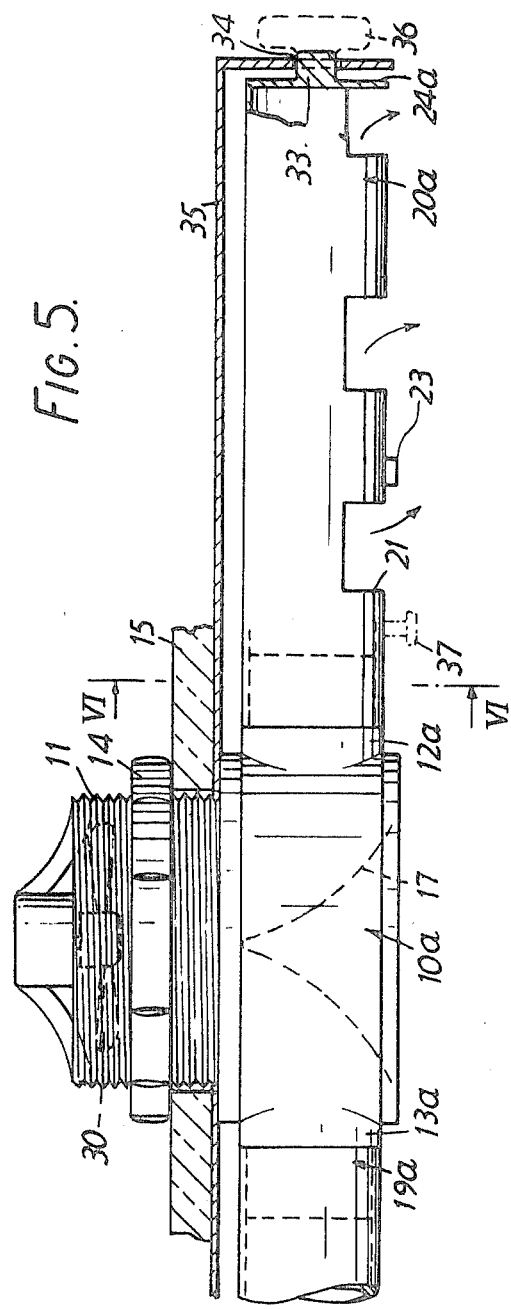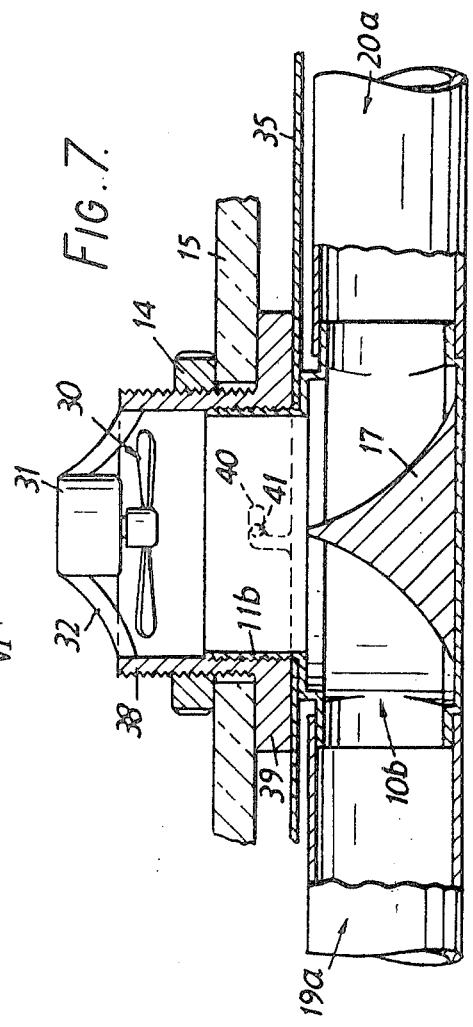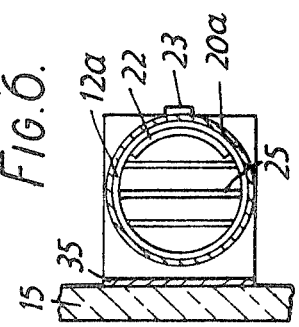

RONALD WINNETT, Inventor

By. Wenderoth, Lind & Ponack
Attorneys

RONALD WINNETT, Inventor

VENTILATOR WITH SHUTTER MEANS

This invention relates to a ventilator, and has for its object to provide a simply constructed inexpensive and easily fitted ventilator adapted for panel mounting.

In accordance with the invention, a ventilator adapted for panel mounting comprises a hollow body member having a stem and at least one side branch leading off the stem, means associated with the stem adapted to secure the stem within a hole cut in a panel for mounting the ventilator to the panel, an elongate duct member communicating with the or each branch of the body member and mounted with respect to the body member so as to form a general prolongation of the branch, and a plurality of vent openings in the duct member.

The hollow body member which comprises the main section of the ventilator may take the general form of an elbow having a single branch to which a duct member is fitted, but in the more generally convenient construction the main body member is in the form of a "Tee" fitting the stem of which is adapted to be mounted in the panel and the head of which two branches. A duct member is then fitted to each branch.

The panel in which the ventilator is fitted may be a glass pane of the window of a dwelling house, office, shop or other building or a partition which comprises a wall of such a structure. The panel may further be a body panel of a car or other vehicle.

The ventilator can be readily fitted in a single hole cut through a panel as above-mentioned by inserting the stem through the hole from the inside of the room or other space e.g., car interior to be ventilated, the stem being threaded so as to receive a clamping ring which secures the stem from the outside. In this form the ventilator is relatively simply fitted by the "do-it-yourself man." An electrically driven fan is preferably fitted within the stem so as to generate a positive flow of air through the ventilator. The duct may conveniently include a sliding shutter by the operation of which the area of the vent openings in the duct may be varied to enable the flow of air to be controlled, and the duct preferably includes in addition internal air guide means for directing the flow of air therethrough.

In another embodiment of the invention, the elongated duct members are mounted so as to be rotatable about their longitudinal axes with respect to the body member. This further provides control over the direction of air flow from or to the ventilator. The ducts may be mounted on the main body member and retained thereon by spring clips. An advantage of this construction is that the ducts may be readily detached from the main body member for cleaning when required.

In another modification, a mounting ring is clamped within the hole cut in the panel, and the stem is releasably secured within the mounting ring. This modification provides additional facility for detaching the body member of the ventilator for cleaning, and also facilitates access to the fan.

A still further modification comprises forming the hollow body member to house a replaceable air filter element of any suitable type.

It is proposed that the ventilator may be made throughout, with the necessary exception of certain parts of the fan motor, of transparent synthetic resin material, thus achieving strength and light weight and allowing the ventilator in window mounting installations to pass the maximum of light and also to interfere as little as possible with vision. The ventilator may be constructed with a degree of flexibility of at least the ducts to accommodate the curvature of any panels to which it may be fitted; this applies in particular to car body panels. An exterior hood may be fitted to the ventilator to keep out rain and snow if needed.

Further objects and advantages of the invention become apparent from the following detailed description, made with reference to the accompanying drawings, of preferred embodiments thereof. In the drawings:

FIG. 1 is a plan view of one embodiment of a ventilator in accordance with this invention;

FIG. 2 is an elevation of the ventilator of FIG. 1;

FIG. 3 is an enlarged cross-sectional plan view of the duct of the ventilator of this embodiment, taken along the line III—III in FIG. 2;

FIG. 4 is a cross-sectional view taken along the line IV—IV in FIG. 3;

FIG. 5 is a partial plan view of a second embodiment of ventilator in accordance with this invention, the outer end of one duct being shown in section;

FIG. 6 is a cross-sectional view taken along the line VI—VI in FIG. 5;

FIG. 7 is a cross-sectional plan view of a modified hollow body member in a third embodiment of ventilator;

Figure 8:
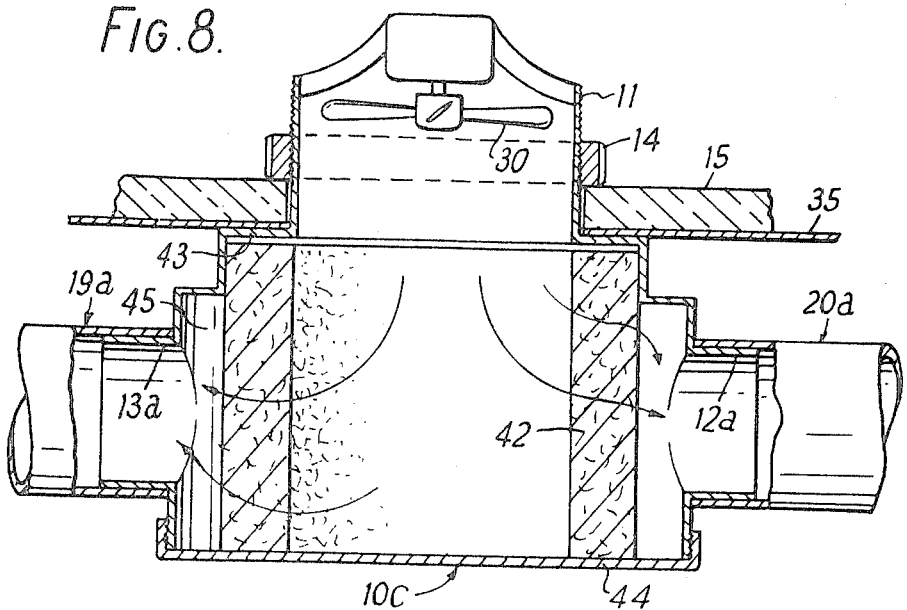
FIG. 8 is a cross-sectional plan view of the hollow body member of a fourth embodiment of ventilator.

The embodiment of ventilator according to this invention shown in FIGS. 1 to 4 of the drawings embodies a hollow main body member 10 in the form of a "Tee" fitting having a stem 11 and two side branches 12 and 13 leading off the stem 11. The stem 11 is threaded to receive a clamping ring 14 which constitutes a securing means for securing the ventilator body member within a hole cut in a panel shown as a glass window pane 15. To install the ventilator in the glass pane 15, a circular hole is cut through the glass pane 15 and the stem 11 is inserted through the hole from the inside, e.g., from the side of the space to be ventilated. The clamping ring 14 is then threaded from the outside onto the stem and tightened down against the outside of the glass pane 15. A weathertight seal with the glass pane may be provided by the use of mastic (not shown) or a sealing ring (not shown) may be interposed between the clamping ring 14 and the glass pane 15. A suitable cowl 16 may then be fitted over the outside stem if desired to prevent the entry into the stem 11 of the rain or snow.

An electrically driven fan 30 is mounted within the stem 11, the fan motor 31 being held centrally of the stem by a spider 32. Between the stem 11 and side branches 12 and 13 and within the body member 10 is a deflector 17 which serves to deflect air entering the stem 11 towards the two side branches and provide maximum air flow in the two branches, or vice versa, according to the direction of air flow induced by the fan. Preferably, the fan of a type which as known per se is reversible so that the ventilator can be employed either to admit fresh air to or extract stale air from the space being ventilated.

Mounted on the branches 12 and 13 and extending as a general prolongation of the two branches are two tubular arms or ducts 19 and 20. As the ducts are similar, only the duct 20 will be further described. While it will be apparent that the duct may be formed in any convenient shape, in this embodiment the duct 20 is a generally rectangular duct and is mounted in an airtight manner on the branch 12 such as by being made as a push-on snap fit, or by adhesive or any other means. One wall of the duct contains a plurality of vent openings 21, three in the present instance. Arranged behind the vent openings within the duct is a shutter 22 provided with an exteriorly accessible operating button 23 which projects through a slot in the duct wall. The shutter 22 is formed with openings corresponding to the vent openings 21 and is adapted to be slid manually longitudinally of the duct to cover and uncover partially or completely the vent openings 21 and so control the flow of air through the vent openings. The end vent opening 21 remote from the main body member 10 is formed across the corner of the duct 20 to assist the flow of air at the end of the ventilator, and the shutter 22 is suitably formed to close against the end wall 24 of the duct.

Air guide means are provided within the interior of the duct 20 and comprise strips 25 of a resilient sheet material the top and bottom edges of which are received within grooves 26 in the opposite inside walls 27 and 28 of the duct that respectively adjoin the wall having the vent openings 21 therein. Three strips 25 subdivide the interior of the duct into three airflow passageways each of which extends from an air vent opening 21 to adjacent the end of the duct 20 which is mounted on the branch 12. The grooves 26 adjacent the branch end of the duct are formed with a notch 29 into which the ends of the strips 25 spring so as to hold the strips 25 in place within the grooves. The width of the grooves 26 with the notch 29 and at their other ends adjacent the event openings 21 behind the shutter 22 is substantially the same as the thickness of the strips 25, and intermediate the two ends the grooves 26 are widened out so as to give clearance permitting a degree of flexing of the ducts 20 relative to the strips 25. An air guide 80 is provided across the end corner of the duct 20 opposite the end vent 21.

Air flow through the ventilator when the fan 30 is driven to draw air from the outside to the space to be ventilated is schematically represented in the drawings by arrows, and it will be noted that the air guide strips 25 divide the interior of the duct into a plurality of separate airflow passageways corresponding in number to the number of vent openings in the duct, each vent opening communicating with an individual passageway. In this way it is assured that there is flow of air through each individual vent opening.

A second embodiment of ventilator constructed according to this invention is shown in FIGS. 5 and 6. In this embodiment, the ventilator hollow body member 10a is constructed in the same manner as the body member 10 of the previous embodiment, except that the branches 12a and 13a terminate in portions of circular cross section to connect with circular duct members 19a and 20a. The ducts 19a and 20a are again similar, and only the one duct 20a will be further described.

The duct 20a is, as stated, of circular cross section, and is mounted on the branch 12a so as to be capable of rotation about its longitudinal axis with respect to the main body member 10a. The end wall 24a of the circular duct 20a is moulded with a projecting pivot pin 33 which is rotatably received within an aperture 34 in a spring clip 35. The spring clip 35 is constituted by a generally flat spring strip, which may be formed of sheet steel or a moulded synthetic resin, and which extends the length of the ventilator comprising the duct 19a, the hollow body member 10a and the duct 20a, the outer ends of the spring strip being turned through an angle of 90° to extend in proximity to the end walls 24a of the ducts. The spring clip 35 is mounted by being clamped between the body member 10a and the glass pane 15. Instead of a single spring clip 35, two separate spring clips one associated with each duct, may be provided.

The duct 20a includes a shutter 22 controlling the flow of air through vent openings 21, and air guide means comprising the strips 25 as in the former embodiment. The facility provided by this embodiment of rotating the ducts 19a and 20a about their longitudinal axes enables the air flow through the openings 21 to be spatially directed as required. For example, by appropriately setting the rotational position of the ducts 19a and 20a, the flow of air can be directed parallel to the face of the glass pane 15 either upwardly or downwardly with respect to FIG. 6, and to any intermediate position. The duct 19a may, of course, be set in a different rotational position from the duct 20a. In addition, either or both of the ducts may be rotated so as to direct the air flow inwardly against the glass 15.

The ducts 19a and 20a of this embodiment may be readily removed for cleaning. All that is required is to flex the end of the spring clip 35 to release the pin 33 from within hole 34, following which the duct can be eased longitudinally off the branch of the body member. Re-assembly takes place by a reverse procedure. If desired, a manually grippable knob 36 may be pushed onto the pivot pin 33 to provide a ready means of rotatably positioning the duct. Alternatively, the duct may be formed with a handle 37.

FIG. 7 illustrates another embodiment of ventilator having a modified mounting and securing means. In the modification, a mounting ring 38 is clamped in position within the hole cut in the glass pane 15, and the stem 11b of the hollow body member 10b is secured within the mounting ring 38. The mounting ring 38 is threaded to receive the clamping ring 14, and has an annular flange 39 which is clamped against the inside face of the glass pane 15 when the clamping ring 14 is tightened against the outside of the glass. The body member 10b and the mounting ring 38 are formed with interengaging means for releasably securing the step 11b within the mounting ring 38. These interengaging means may take any of a plurality of forms, and by way of example there are shown in FIG. 7 two forms which these means may take. In one form, the body member 10b is releasably secured to the mounting ring 38 as by exteriorly screw threading the stem 11b and screwing the stem into the mounting ring 38; in the alternative form a plug-in connection of the bayonet-type is provided wherein grooves 40 are formed in the mounting ring 38 and are adapted to receive pins 41 projecting from the exterior of the stem 11b. Whatever the form adopted, the member 10b can be readily detached from the mounting ring for cleaning thereof and also to facilitate access from within the space being ventilated to the fan 30 and fan motor 31 for cleaning and servicing, the spider 32 being in this case formed as part of the mounting ring 38.

The body member 10b in FIG. 7 is shown as being provided with the ducts 19a and 20a of FIGS. 5 and 6. The spring clip 35 is shown as being clamped between the body member 10b and the flange 39 of the mounting ring, so that when the body member 10b is detached from the mounting ring 38 the spring member 35 is also released. If desired the spring clip can be permanently mounted by clamping it between the flange 39 and the inside face of the glass pane 15; this arrangement is not illustrated. It will furthermore be understood that the body member 10b can be formed to receive the square ducts 19 and 20 shown in FIGS. 1 to 4.

FIG. 8 illustrates an embodiment of the ventilator in which the body member 10c is of generally similar construction to the body member 10a but is enlarged to contain internally thereof an air filter element 42. The air filter element 42, which may be of any suitable construction, for example a micro-cellular paper type element, is held and located by an annular shoulder 43 of the body member 10c and a screw-on body cap 44. By unscrewing the cap 44 from the end of the body member 10c, the filter element 42 may be removed and exchanged, or cleaned if it is a type of element that can be cleaned. Whereas the ventilator is again shown as having ducts 19a and 20a, it will be understood that the body member 10c can be formed to receive the square ducts 19 and 20 of FIGS. 1 to 4.

Air flow through the filter element is represented schematically by the arrows. It will be seen that the body member 10c is shaped and dimensioned to provide an annular collecting chamber 45 surrounding the filter element 42 and in communication with the branches 12a and 13a, whereas the stem 11 communicates with the interior of the air filter element 42.

Figure 9:
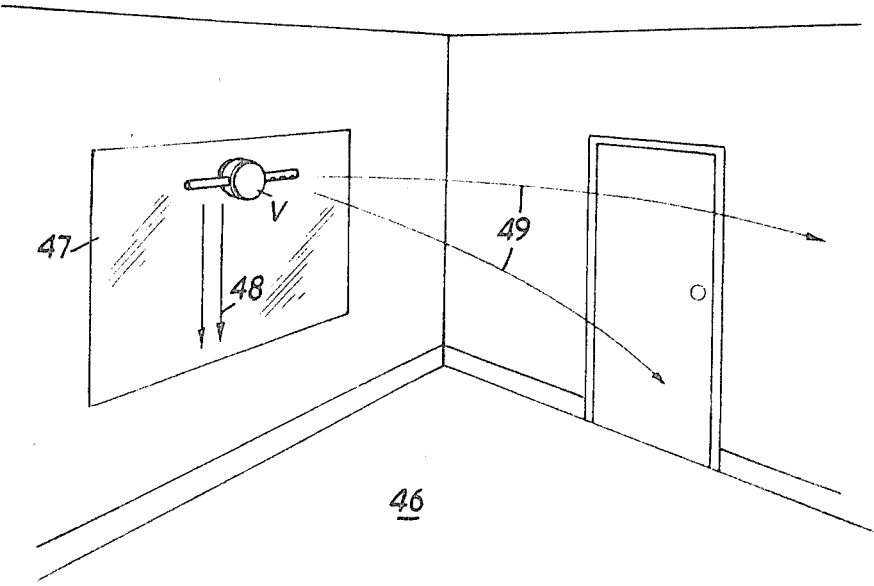
FIG. 9 is a schematic representational perspective view showing a ventilator according to this invention installed in a window of a dwelling room.

FIG. 9 schematically represents a room 46 having a window 47 in which a ventilator V according to this invention is installed. The ventilator V is constructed according to any one of the embodiments above described, and is installed in the manner that has been described. It will be seen that ventilation throughout substantially the entire room space can be obtained by use of the ventilator of this invention. With a ventilator having the ducts 19a and 20a, it will be appreciated how the ducts may readily be set in the rotational positions necessary to create the air-flow pattern represented by the arrows 48 and 49 in FIG. 9. A somewhat similar effect can be obtained with a ventilator having the square ducts 19 and 20 as shown in FIGS. 1 to 4, by setting the two ducts so that the vent openings in one duct are at right angles to the vent openings in the other duct.

The ventilator is preferably constructed throughout of a transparent material, preferably a synthetic resin, to provide the minimum interference with light entering through the window pane 15 to which it is fitted, although for purposes of illustration in the accompanying drawings, the ventilator has been shown as being constructed of an opaque material. At least the ducts are furthermore preferably constructed of a pliable material so that they will flex to follow the contour of any curved panel to which it may be desired to fit the ventilator, for example, a curved glass pane, curved wall partition panel or a car body panel, and to make them more resistant to shock.

Figure 10:
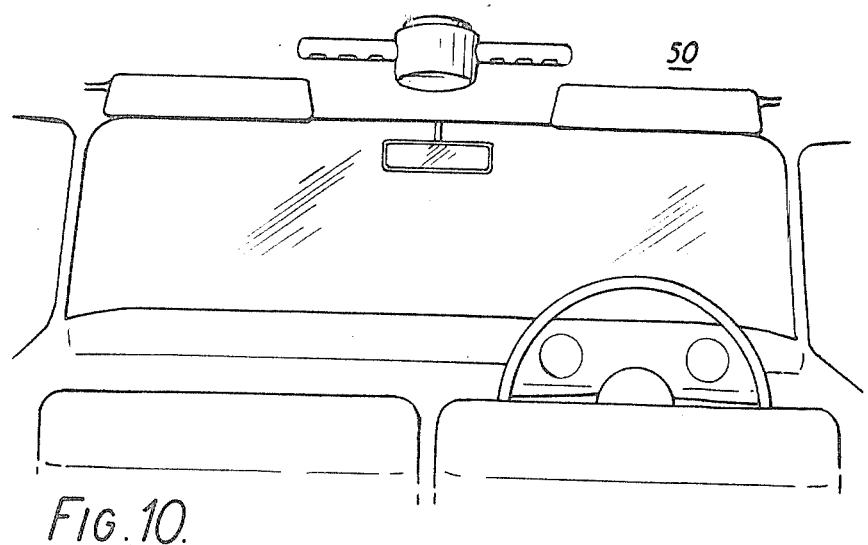
FIG. 10 is a view of the interior of a motor car illustrating the installation of a ventilator according to this invention in the car roof panel.
Figure 11:
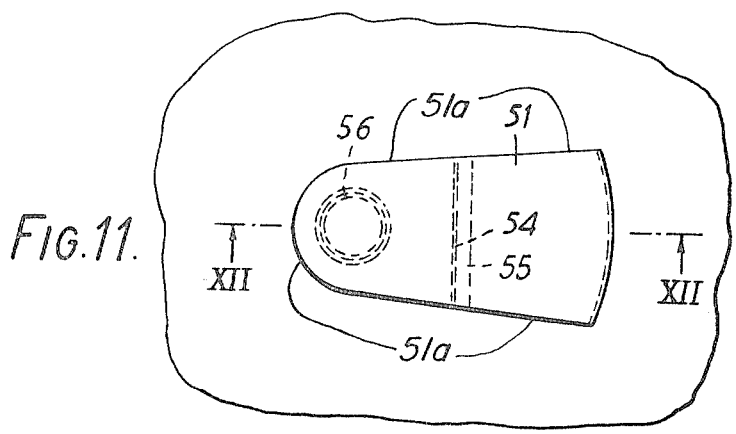
FIG. 11 is a plan view of a portion of the car roof panel showing an external air scoop.
Figure 12:
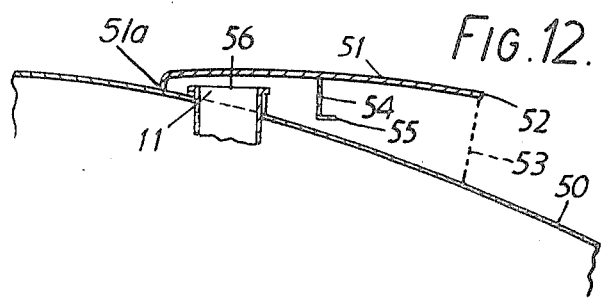
FIG. 12 is a cross-sectional view taken on the line XII—XII in FIG. 11.

An example of the ventilator fitted to a car body panel is shown in FIGS. 10 to 12. In FIG. 10, the ventilator V is fitted into a hole cut in the center of a car roof panel 50 above the wind-screen. The car roof panel is an normal somewhat curved, and the ducts flex to follow the contour of the roof curve. The wider portions of the grooves 26 within the ducts intermediate the ends thereof allow the air guide strips 25 freedom for movement during this flexing of the ducts. The ventilator when fitted in a car is preferably a ventilator having the rotatable ducts 19a and 20a, which can be positioned as required to direct fresh air towards the faces of the passengers in the car or on to the wind-screen.

When the ventilator is fitted to a moving vehicle, motion of the vehicle will normally causes sufficient air to flow through the ventilator that the fan 30 can be dispensed with. The fan can still be provided if desired to supplement the air flow. The stem 11 of the ventilator, which projects to the outside of the car roof, is preferably housed within an air scoop 51 as shown in FIGS. 11 and 12. The air scoop 51, which may be a metal pressing or a synthetic resin moulding, and is preferably of a color to match the paint work of the car, has a leading edge 52 spaced above the car roof 50 at its forward end, and is sealed to the car roof around its bottom edge 51a. The intake opening of the scoop 51 beneath the edge 52 is covered by a screen 53 which prevents any solid material or insects from being passed into the ventilator stem 11. In the case of driving rain or snow, the possibility exists that rain or snow travelling substantially horizontally may pass the screen 53 and be deflected by the top of the rear end of the scoop 51 into the stem 11. To guard against this possibility a baffle 54 is mounted within the scoop 51, and projects downwardly from the scoop to a terminal a position or edge 55 which is horizontally below the level of the top edge 56 of the stem 11. The baffle 54 extends across the full width of the scoop 51 and intercepts rain or snow driving into the scoop through the screen 53. Due to the contours of the roof, the interior of the scoop 51 is self-draining through the screen 53.

A second ventilator V and scoop 51 may be fitted to the car roof panel 50 near the rear of the car, with the scoop 51 facing the rear, for the purpose of extracting stale air from the rear of the car.

If desired, the vent openings 21 in either of the forms of duct illustrated may be formed with louvres to provide further control over the direction of air flow; this arrangement is not illustrated. Various other and further modifications will undoubtedly occur to those skilled in the art, and all such modifications are within the scope of this invention.

I claim:

1. A ventilator adapted for panel mounting comprising a hollow body member having a stem and at least one side branch leading off the stem, means associated with said stem adapted to secure said stem within a hole cut in a panel for mounting the ventilator to the panel, an elongate duct member communicating with said at least one branch of said body member and mounted with respect to said body member so as to form a general prolongation of said branch, a plurality of vent openings in said duct member, shutter means slidably mounted within said duct member behind said vent openings and manually operable to vary the area of said vent openings, internal air guide means within said duct member, which air guide means comprise strips of resilient sheet material housed in grooves formed in two opposite inside walls of said duct member, and which sheet material strips divide the interior of said duct member into a plurality of separate air-flow passageways corresponding in number to the number of said vent openings, and each of said vent openings communicating with an individual passageway.

2. A ventilator as claimed in claim 1 comprising means mounting said duct member for rotation about its longitudinal axis with respect to said body member, including means rotatably mounting one end of said duct member on said body member and spring clip means releasably and rotatably retaining the other end of said duct member whereby on flexing of said spring clip means to release the said other end of said duct member said duct member can be detached from said body member.

3. A ventilator as claimed in claim 1, wherein said means adapted to secure said stem comprise a clamping ring which has screw-threaded engagement with said stem.

4. A ventilator as claimed in claim 1, said means adapted to mount the ventilator comprise a mounting ring adapted to be secured within the hole cut in said panel, said mounting ring and said stem having interengaging means for releasably securing said stem within said mounting ring.

5. A ventilator as claimed in claim 1, further comprising a replaceable air filter means housed within said hollow body member.

6. A ventilator as claimed in claim 1, further comprising electrically driven fan means fitted within said stem.

7. A ventilator as claimed in claim 1, wherein at least said duct member is constructed of a pliable material.

8. A ventilator as claimed in claim 1, in combination with air scoop means for mounting externally of a vehicle body panel.

9. A ventilator as claimed in claim 8, wherein said air scoop means has an intake opening covered by a screen, and interceptor baffle means is mounted within the scoop means.

* * * * *